(12) United States Patent
Li (10) Patent No.: US 11,735,100 B2
(45) Date of Patent: Aug. 22, 2023

(54) DISPLAY PANEL AND DRIVING METHOD THEREOF

(71) Applicant: TCL China Star Optoelectronics Technology Co., Ltd., Guangdong (CN)

(72) Inventor: Wenfang Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 329 days.

(21) Appl. No.: 17/255,514

(22) PCT Filed: Dec. 18, 2020

(86) PCT No.: PCT/CN2020/137584
§ 371 (c)(1),
(2) Date: Dec. 23, 2020

(87) PCT Pub. No.: WO2022/116292
PCT Pub. Date: Jun. 9, 2022

(65) Prior Publication Data
US 2022/0406242 A1    Dec. 22, 2022

(30) Foreign Application Priority Data
Dec. 2, 2020    (CN) .......................... 202011392094.3

(51) Int. Cl.
*G09G 3/32*    (2016.01)
(52) U.S. Cl.
CPC ......... *G09G 3/32* (2013.01); *G09G 2320/043* (2013.01); *G09G 2320/0626* (2013.01)

(58) Field of Classification Search
CPC ............ G09G 3/32; G09G 2320/0626; G09G 3/2007; G09G 2320/041; G09G 2320/043; G09G 2330/04; G09G 2330/025; G09G 2330/023; Y02B 20/30
See application file for complete search history.

(56) References Cited

U.S. PATENT DOCUMENTS

| | | | |
|---|---|---|---|
| 2016/0307490 A1* | 10/2016 | Lee ...................... | G09G 3/3225 |
| 2017/0053587 A1* | 2/2017 | Kim ...................... | G09G 3/2092 |
| 2019/0139490 A1* | 5/2019 | Bang .................... | G09G 3/2007 |
| 2020/0051496 A1* | 2/2020 | Kang ................... | G09G 3/3275 |

FOREIGN PATENT DOCUMENTS

| | | |
|---|---|---|
| CN | 101266755 | 9/2008 |
| CN | 101764516 | 6/2010 |
| CN | 104252847 | 12/2014 |
| CN | 109346016 | 2/2019 |
| CN | 110459169 | 11/2019 |
| CN | 111653230 | 9/2020 |
| EP | 3038079 | 6/2016 |
| KR | 2010-0003591 | 1/2010 |

* cited by examiner

*Primary Examiner* — Muhammad N Edun (57) ABSTRACT

The present disclosure provides a display panel and a driving method thereof. The display panel includes a power supply module configured to provide a drive current for the drive module, a drive module configured to output a drive current to drive the light-emitting module to emit light, a current detection module configured to detect the drive current and output detection signals to the control module according to the detection result, and a control module configured to adjust the grayscale value of the pixels of the display panel according to the detection signals.

15 Claims, 3 Drawing Sheets

DISPLAY PANEL AND DRIVING METHOD THEREOF

RELATED APPLICATIONS

This application is a National Phase of PCT Patent Application No. PCT/CN2020/137584 having International filing date of Dec. 18, 2020, which claims the benefit of priority of Chinese Patent Application No. 202011392094.3 filed on Dec. 2, 2020. The contents of the above applications are all incorporated by reference as if fully set forth herein in their entirety.

FIELD AND BACKGROUND OF THE INVENTION

The present disclosure relates to the field of display technologies, and particularly relates to a display panel and a method for driving the display panel.

As people have higher and higher requirements for display quality of display panels such as TVs, the display panel such as organic light-emitting diode (OLED) panels and mini light-emitting diode (mini-LEDs) panels have become a development trend in the industry. mini-LEDs display technology uses a plurality of small LED lamps as light sources of a display panel, so as to realize partition control and improve contrast and saturation of the display screen. In mini-LEDs panels, a driving mode of the LED lamps is constant voltage driving. In order to meet brightness requirements and power requirements at room temperature, a driving voltage of the LED lamps is preset.

SUMMARY OF THE INVENTION

Due to characteristics of LED lamps, a drive current of the LED lamps will increase at high temperatures, resulting in an increase in an overall power of the display panel and consequently affecting reliability and service life of the display panel.

In the first aspect, the present disclosure provides a display panel, wherein the display panel comprises a light-emitting module, a power supply module, a drive module, a current detection module, and a control module;

the power supply module is connected to the drive module, and the power supply module is configured to provide a drive current for the drive module;

the drive module is connected to the light-emitting module, and the drive module is configured to output the drive current to drive the light-emitting module to emit light;

the current detection module is configured to detect the drive current, and output detection signals to the control module according to detection results of the drive current; and the control module is configured to adjust grayscale value of pixels of the display panel according to the detection signals.

In some embodiments, the current detection module is configured to alternately output first detection signals of a first potential and second detection signals of a second potential to the control module when a current value of the drive current is greater than or equal to a preset current value of the drive current, and the first potential is greater than the second potential; and the control module is configured to adjust the grayscale value of the pixels of the display panel according to the second detection signals received, thereby decreasing the grayscale value of the pixels of the display panel from a first grayscale value to a second grayscale value.

In some embodiments, the control module is further configured to control the grayscale value of the pixels of the display panel to maintain the second grayscale value when a number of times of the second detection signals received within a frame time is greater than a preset value of times of the second detection signals received within a frame time.

In some embodiments, the control module is further configured to adjust the grayscale value of the pixels of the display panel when a number of times of the second detection signals received within a frame time is less than a preset value of times of the second detection signals received within a frame time, thereby restoring the grayscale value of the pixels of the display panel from the second grayscale value to the first grayscale value.

In some embodiments, the light-emitting module comprises at least two light-emitting units, and each of the light-emitting units comprises a plurality of light sources;

the drive module comprises drive units corresponding to and connected to the light-emitting units one-to-one, and each of the drive units is configured to output the drive current to drive a corresponding one of the light-emitting units to emit light;

a voltage output terminal of the power supply module is connected to voltage access terminals of all of the drive units to provide the drive current for all of the drive units; and the current detection module comprises current detection units corresponding to the drive units one-to-one, and each of the current detection units is configured to detect the drive current of a corresponding one of the drive units, and is configured to output the detection signals to the control module according to detection results.

In some embodiments, each of the current detection units comprises a current detection resistor and a current detector; and wherein, the current detection resistor is connected in series between the voltage output terminal of the power supply module and one of the voltage access terminals of the drive units, and two ends of the current detector are respectively connected to two ends of the current detection resistor for detecting the drive current.

In the second aspect, the present disclosure provides a method for driving a display panel, wherein the display panel comprises a light-emitting module, a drive module, a power supply module, a current detection module, and a control module, the method for driving the display panel comprises following steps:

S10, the power supply module providing a drive current for the drive module;

S20, the drive module outputting the drive current to drive the light-emitting module to emit light;

S30, the current detection module detecting the drive current, and outputting detection signals to the control module according to detection results of the drive current; and S40, the control module adjusting grayscale value of pixels of the display panel according to the detection signals.

In some embodiments, in the step S30, when a current value of the drive current is greater than or equal to a preset current value of the drive current, the current detection module alternately outputs first detection signals of a first potential and second detection signals of a second potential to the control module, and the first potential is greater than the second potential; and in the step S40, when the control module receives the second detection signals, the control module adjusts the grayscale value of the pixels of the display panel, thereby decreasing the grayscale value of the pixels of the display panel from a first grayscale value to a second grayscale value.

In some embodiments, in the step S40, when a number of times of the second detection signals received within a frame time is greater than a preset value of times of the second detection signals received within a frame time, the control module controls the grayscale value of the pixels of the display panel to be maintained as the second grayscale value.

In some embodiments, in the step S40, when a number of times of the second detection signals received within a frame time is less than a preset value of times of the second detection signals received within a frame time, the control module adjusts the grayscale value of the pixels of the display panel, thereby restoring the grayscale value of the pixels of the display panel from the second grayscale value to the first grayscale value.

In the third aspect, the present disclosure provides a display panel, wherein the display panel comprises a light-emitting module, a power supply module, a drive module, a current detection module, and a control module;

the light-emitting module is configured to emit light, and the light-emitting module comprises a plurality of light-emitting diode (LED) lamps distributed in an array;

the power supply module is connected to the drive module, and the power supply module is configured to provide a drive current for the drive module;

the drive module is connected to the light-emitting module, and the drive module is configured to output the drive current to drive the light-emitting module to emit light;

the current detection module is configured to detect the drive current, and output detection signals to the control module according to detection results of the drive current; and the control module is configured to adjust grayscale value of pixels of the display panel according to the detection signals.

In some embodiments, the current detection module is configured to alternately outputs first detection signals of a first potential and second detection signals of a second potential to the control module when the current value of the drive current is greater than or equal to a preset current value of the drive current, and the first potential is greater than the second potential; and the control module is configured to adjust the grayscale value of the pixels of the display panel according to the second detection signals received, thereby decreasing the grayscale value of the pixels of the display panel from a first grayscale value to a second grayscale value.

In some embodiments, the control module is further configured to control the grayscale value of the pixels of the display panel to maintain the second grayscale value when a number of times of the second detection signals received within a frame time is greater than a preset value of times of the second detection signals are received within a frame time.

In some embodiments, the control module is further configured to adjust the grayscale value of the pixels of the display panel when a number of times of the second detection signals received within a frame time is less than the preset value of times of the second detection signals are received within a frame time, thereby restoring the grayscale value of the pixels of the display panel from the second grayscale value to the first grayscale value.

In some embodiments, the first grayscale value is 55, and the second grayscale value is 45.

In some embodiments, the light-emitting module comprises at least two light-emitting units, and each of the light-emitting units comprises a plurality of light sources;

the drive module comprises drive units corresponding to and connected to the light-emitting units one-to-one, and each of the drive units is configured to output the drive current to drive a corresponding one of the light-emitting units to emit light;

a voltage output terminal of the power supply module is connected to voltage access terminals of all of the drive units to provide the drive current for all of the drive units; and the current detection module comprises current detection units corresponding to the drive units one-to-one, and each of the current detection units is configured to detecting the drive current of a corresponding one of the drive units, and is configured to output the detection signals to the control module according to the detection results.

In some embodiments, each of the current detection units comprises a current detection resistor and a current detector; and wherein, the current detection resistor is connected in series between the voltage output terminal of the power supply module and one of the voltage access terminals of the drive units, and two ends of the current detector are respectively connected to two ends of the current detection resistor for detecting the drive current.

In some embodiments, each of the current detection units further comprises a protection resistor, a first end of the protection resistor is connected to the current detector, and a second end of the protection resistor is grounded or connected to a reference voltage.

When the display panel is in a high temperature environment, the current value of the drive current of the light-emitting module increases. When the drive current is greater than or equal to the preset current value, the current detection module alternately outputs the first detection signals and the second detection signals to the control module. The control module responds according to the second detection signals received, thereby decreasing the grayscale value of the pixels of the display panel, thereby reducing the overall power of the display panel, and avoiding excessive power of the display panel from affecting reliability and service life of the display panel. At the same time, the number of the second detection signals received by the control module within a frame time, that is, the number of alternations between the first detection signals and the second detection signals, determine whether it is necessary to restore the grayscale value of the pixels to the first grayscale value, which may ensure a promptly response when the drive current is too large. At the same time, the grayscale value of the pixels may be restored in time when an instantaneous current of the drive current is too large and an overcurrent protection is falsely triggered, so as to ensure a normal display of the display panel.

BRIEF DESCRIPTION OF THE SEVERAL VIEWS OF THE DRAWINGS

The following detailed description of the specific implementations of the present disclosure in conjunction with accompanying drawings will make technical solutions and other beneficial effects of the present disclosure obvious.

REFERENCE NUMBERS 10. light-emitting module; 11. light-emitting units; 20. drive module; 21. drive units; 30. power supply module; 40. current detection module; 41. current detection resistor; 50. control module.

DESCRIPTION OF SPECIFIC EMBODIMENTS OF THE INVENTION

The description of the following embodiments refers to attached drawings to illustrate specific embodiments in which the present disclosure may be implemented. The directional terms mentioned in the present disclosure, such as "up", "down", "front", "back", "left", "right", "inner", "outer", "side", etc., are for reference only a direction of the attached drawings. Therefore, the directional terms used are configured to describe and understand the present disclosure, rather than to limit the present disclosure. In the figure, units with similar structures are indicated by the same reference numerals.

This present disclosure is aimed at the prior art display panel using mini light-emitting diodes (mini-LEDs) as light source. Due to characteristics of light-emitting diode (LED) lamps, the drive current of the LED lamps will increase at high temperatures, resulting in an increase in the overall power of the display panel and consequently causing technical issues that affect reliability and the service life of the display panel.

Figure 1:
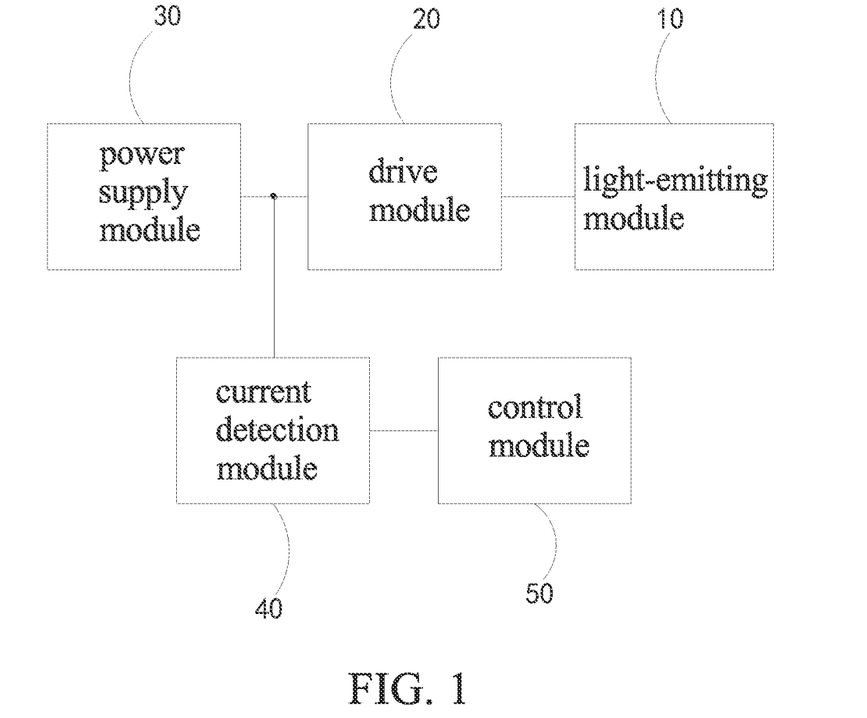
FIG. 1 is a first structure schematic view of a display panel provided by one embodiment of the present disclosure.

The present disclosure provides a display panel. As shown in FIG. 1, the display panel includes a light-emitting module 10, a drive module 20, a power supply module 30, a current detection module 40, and a control module 50.

Specifically, the light-emitting module 10 is configured to emit light to provide display light sources for the display panel; the light-emitting module 10 may include a plurality of LED lamps distributed in an array.

Specifically, the power supply module 30 is connected to the drive module 20, the power supply module 30 is configured to provide a drive current for the drive module 20, and the drive current is configured to drive the light-emitting module 10 to emit light, i.e., the drive current is configured to drive the LED lamps to emit light.

Wherein, a magnitude of the drive current is determined by a drive voltage provided by the power supply module 30, the drive voltage may be 30 volts, and the drive voltage may also be selected according to actual conditions.

Specifically, the drive module 20 is connected to the light-emitting module 10, and the drive module 20 is configured to output a drive current to drive the light-emitting module 10 to emit light.

Wherein, the drive module 20 is configured to transmit drive current to the light-emitting module 10 after receiving the drive current provided by the power supply module 30, so that the light-emitting module 10 emits light while being driven by the drive current.

Specifically, the current detection module 40 is configured to detect the drive current and output detection signals to the control module 50 according to the detection result of the drive current.

In one embodiment, the current detection module 40 detects that the drive current is connected to the drive module 20, so as to respond more promptly when the drive current is too high and to avoid damaging the drive module 20 and LED lamps when the drive current is too high.

It should be noted that the current detection module 40 may also detect drive current output of the drive module 20.

Specifically, the control module 50 is configured to adjust the grayscale value of the pixels of the display panel according to the detection signals output by the control module 50.

Wherein, the control module 50 may be a field-programmable gate array (FPGA, signal processing board).

It should be noted that the current detection module 40 detects the current value of the drive current and outputs detection signals to the control module 50 according to the detection result, and the control module 50 may respond promptly according to the detection signals, to adjust the grayscale value of the pixels of the display panel. For example, when the drive current of the LED lamps is too high, the control panel reduces the grayscale value of the pixels, thereby decreasing the display brightness of the display panel, so as to decrease the overall power of the display panel. In this way, the display panel may be adapted to work at a variety of temperatures, so as to avoid excessive display power of the display panel when the display panel works in a high-temperature environment, which will affect the reliability and the service life of the display panel.

It should be noted that the display panel may adjust the grayscale value by adjusting the brightness of light sources. When the display panel is a liquid crystal display panel, the control module 50 may also change the grayscale value of the pixels by controlling a rotation angle of liquid crystals.

Specifically, the current detection module 40 is configured to output first detection signals of the first potential to the control module 50 when the current value of the drive current is less than the preset current value of the drive current.

It should be noted that the preset current value of the drive current is an early warning value, and the preset current value of the drive current may be selected according to actual conditions.

It is understandable that when the display panel is in a normal temperature state and the current value of the drive current is less than the preset current value of the drive current, the current detection module 40 may continuously or intermittently output the first detection signals of the first potential, and the control module 50 will not respond to the first detection signals. At this time, even if the drive current is increased, a magnitude of increase in the power of the LED lamps in the light-emitting module 10 is less, and a magnitude of increase in the overall power of the display panel is less. There is no need to adjust the grayscale value of the pixels.

Specifically, the current detection module 40 is further configured to alternately output the first detection signals of the first potential and the second detection signals of the second potential to the control module 50 when the current value of the drive current is greater than or equal to the preset current value of the drive current. The first potential is greater than the second potential.

Wherein, the control module 50 is configured to adjust the grayscale value of the pixels of the display panel according to the second detection signals received, thereby decreasing the grayscale value of the pixels of the display panel from the first grayscale value to the second grayscale value.

It should be noted that the first potential and the second potential may be selected according to actual conditions. For example, the first potential is 15 volts, and the second potential is −15 volts. The first grayscale value and the second grayscale value may be selected according to actual conditions. For example, the first grayscale value is 55, and the second grayscale value is 45.

It is understandable that when the display panel is in a high-temperature environment, due to the characteristics of LED lamps, the drive current of the LED lamps will increase. When the current value of the drive current is greater than or equal to the preset current value of the drive current, it means that the drive current has a larger magnitude of increase. Therefore, the power of the LED lamps in the light-emitting module 10 will increase greatly, i.e., the overall power of the display panel will increase greatly. At this time, the current detection module 40 alternately outputs the first detection signals and the second detection signals, the control module 50 responds accordingly when receiving the second detection signals to reduce the grayscale value of the pixels of the display panel, thereby reducing the overall power of the display panel and avoiding excessive power of the display panel from affecting the reliability and the service life of the display panel.

In one embodiment, the control module 50 is further configured to control the grayscale value of the pixels of the display panel to maintain the second grayscale value when a number of times of the second detection signals received within a frame time is greater than a preset value of times of the second detection signals received within a frame time.

It may be understood that when the current value of the drive current is greater than the preset current value of the drive current and continues for a period of time, during a duration, the current detection module 40 continuously alternately outputs the first detection signals and the second detection signals, and the frequency of occurrence of the second detection signals may indicate a length of the duration. Within a frame, the longer the duration of the current drive current value being greater than the preset drive current is, the greater an average current drive current value is in the time frame. During this duration, the control module 50 controls the grayscale value of the pixels to maintain the second grayscale value, which may ensure that the display power of the display panel is low when the drive current is too high, and it may also be used when instantaneous current of the drive current is too high. After the grayscale value of the pixels are switched, the grayscale value of the pixels may be restored promptly.

In one embodiment, the control module 50 is further configured to adjust the grayscale value of the pixels of the display panel when a number of times of the second detection signals received within a frame time is less than a preset value of times of the second detection signals received within a frame time, thereby restoring the grayscale value of the pixels of the display panel from the second grayscale value to the first grayscale value.

It may be understood that the number of times the second detection signals are received within one frame time is less than the preset value of the times the second detection signals are received within one frame time, indicating that the current value of the drive current is less than the preset value of the drive current. If the duration of the current value is shorter, it may be caused by a false trigger caused by an excessive instantaneous current. For example, the instantaneous drive current will become higher when the grayscale value of the pixels are switched.

It should be noted that the preset value of the number of times the second detection signals are received within a frame time is related to a power limit of the display panel. Generally speaking, the greater the power limit of the display panel, the greater the power limit of a frame time. The preset value of the number of times the second detection signals are received within a frame time may be set greater. For example, when the power limit of the display panel is 330 watt-hours, the preset value of the number of the second detection signals received within a frame time may be 45; when the power limit of the display panel is 250 watt-hours, the preset value of the number of times the second detection signals received within the frame time may be 30.

Figure 2:
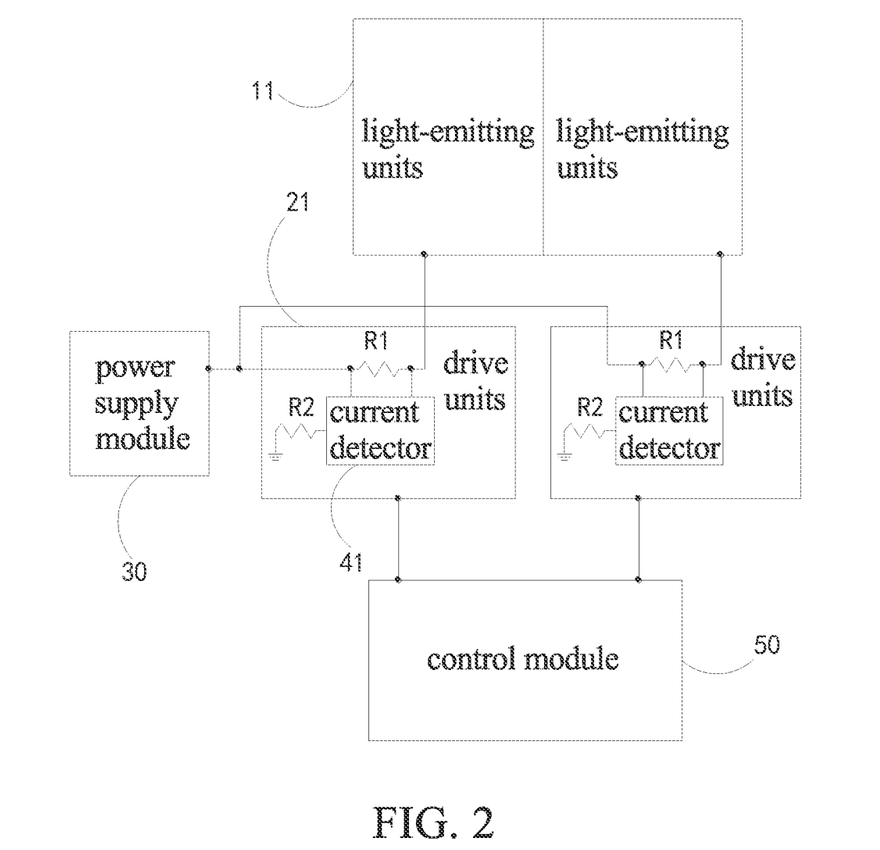
FIG. 2 is a second structure schematic view of the display panel provided by one embodiment of the present disclosure.

Specifically, as shown in FIG. 2, the light-emitting module 10 includes at least two light-emitting units 11. Each of the light emitting-units 11 includes a plurality of light sources, each of the light-emitting units 11 may include a plurality of LED lamps, and each of the light-emitting units 11 can individually control light emission.

Specifically, the drive module 20 includes the drive units 21 corresponding to and connected to the light-emitting units 11 one-to-one, and each of the drive units 21 is configured to output the drive current to drive a corresponding one of the light-emitting units 11 to emit light.

It is understandable that the number of the drive units 21 is the same as the number of the light-emitting units 11, and each of the drive units 21 is correspondingly connected to each of the light-emitting units 11, thereby emitting light of the light-emitting units 11 separately; the drive units 21 may be adapter boards.

Specifically, the voltage output terminal of the power supply module 30 is connected to the voltage access terminals of all of the drive units 21 to provide the drive current for all of the drive units 21, i.e., the power supply module 30 provides the drive current for all of the driving units 21, and the current value of the drive current connected to all of the drive units 21 may be the same or different.

Specifically, the current detection module 40 includes current detection units individually connected to a corresponding drive unit 21, and each of the current detection units is configured to detect the drive current of a corresponding drive unit 21 and output detection signals to the control module 50 according to detection results.

It is understandable that each of the drive units 21 is equipped with one of the current detection units independently, each of the current detection units is configured to detect the drive current connected to or output by the corresponding drive unit 21, and the preset current value of all of the current detection units may be the same or different.

It should be noted that a plurality of the drive units 21 are configured to provide drive current to different light-emitting units 11 to realize better partition control to improve the contrast and saturation of the display screen while each of the current detection units independently detect the drive current of the corresponding drive unit 21 to improve detection efficiency.

In one embodiment, each of the current detection units may be disposed on each of the drive units 21.

In one embodiment, the control module 50 is further configured to control the grayscale value of the pixels of the display panel to maintain the second grayscale value when a number of times of the second detection signals received within a frame time is greater than a preset value of times of the second detection signals received within a frame time.

It should be noted that only when all of the current detection units detects that the corresponding drive units 21 accesses or outputs the drive current greater than the corresponding current preset value for a period of time, the control module 50 controls the grayscale value of the pixels to maintain the second grayscale value, Otherwise, the control module 50 controls the grayscale value of the pixels to restore to the first grayscale value, so as to prevent the grayscale value of the pixels from being kept at the second grayscale value when the overcurrent protection is falsely triggered by one of the current detection units, which affects the display effect.

Specifically, each of the current detection units includes a current detection resistor R1 and a current detector 41.

Wherein, the current detection resistor R1 is connected in series between the voltage output terminal of the power supply module 30 and each of the voltage access terminals of each of the drive units 21, and two ends of the current detector 41 are respectively connected to two ends of the current detection resistor R1 for detecting drive current.

In one embodiment, each of the current detection units further includes a protection resistor R2, a first end of the protection resistor R2 is connected to the current detector 41, and a second end of the protection resistor R2 is grounded or connected to reference voltage. The protection resistor R2 is configured to protect the current detector 41 to prevent damage to the current detector 41 when the current in the current detector 41 is too high.

In one embodiment, the control module 50 is further configured to send a reset signal to the current detection units when a number of times of the second detection signals received within a frame time is less than a preset value of times of the second detection signals received within a frame time, thereby stopping the current detection units from sending the second detection signals.

Figure 3:
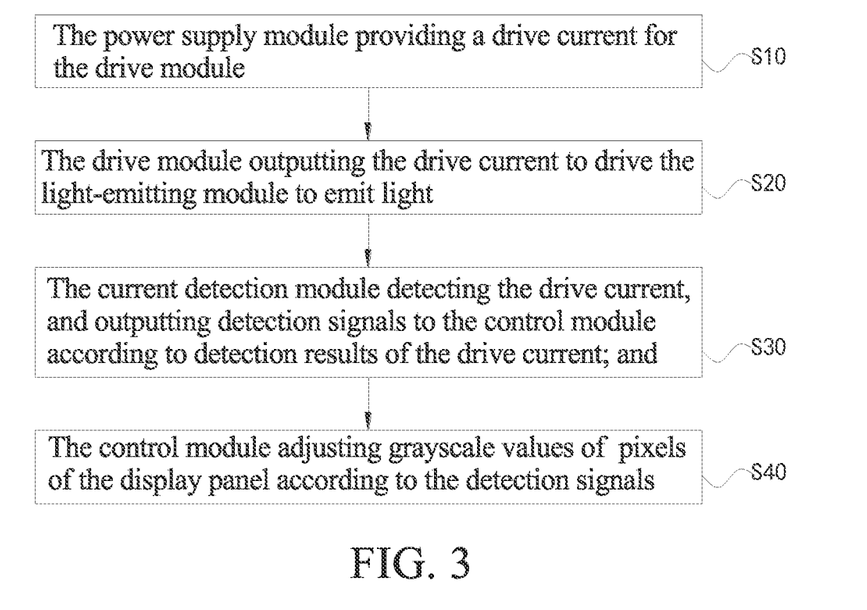
FIG. 3 is a flowchart of a method for driving the display panel provided by one embodiment of the present disclosure.

Based on the display panel described above, the present disclosure further provides a method for driving the display panel. As shown in FIG. 3, the display panel includes a light-emitting module 10, a drive module 20, a power supply module 30, a current detection module 40, and a control module 50. The method for driving the display panel includes following steps:

S10, the power supply module 30 providing a drive current for the drive module 20;

S20, the drive module 20 outputting the drive current to drive the light-emitting module 10 to emit light;

S30, the current detection module 40 detecting the drive current, and outputting detection signals to the control module 50 according to detection results of the drive current; and S40, the control module 50 adjusting grayscale value of pixels of the display panel according to the detection signals.

In one embodiment, in the step S30, when the current value of the drive current is greater than or equal to the preset current value of the drive current, the current detection module 40 alternately outputs the first detection signals of the first potential and the second detection signals of the second potential to the control module 50, and the first potential is greater than the second potential.

Wherein, in the step S40, when the control module 50 receives the second detection signals, the control module adjusts the grayscale value of the pixels of the display panel, thereby decreasing the grayscale value of the pixels of the display panel from the first grayscale value to the second grayscale value.

In one embodiment, in the step S40, the control module 50 control the grayscale value of the pixels of the display panel to maintain the second grayscale value when a number of times of the second detection signals received within a frame time is greater than a preset value of times of the second detection signals received within a frame time.

In one embodiment, in the step S40, when a number of times of the second detection signals received by the control module 50 within a frame time is less than a preset value of times of the second detection signals received by the control module 50 within a frame time, the control module 50 adjusts the grayscale value of the pixels of the display panel, thereby restoring the grayscale value of the pixels of the display panel from the second grayscale value to the first grayscale value.

The light-emitting units 11 includes at least two light-emitting units, each of the light-emitting units includes a plurality of light lamps, and each one of the light-emitting units 11 can individually control light emission.

Specifically, the drive module 20 includes the drive units 21 individually connected to a corresponding light-emitting units 11, and each of the drive units 21 is configured to output the drive current to drive a corresponding light-emitting unit 11 to emit light.

It is understandable that the number of the drive units 21 is the same as the number of the light-emitting units 11, and each of the drive units 21 is correspondingly connected to each of the light-emitting units 11, allowing the light-emitting units 11 to emit light individually.

Specifically, the voltage output terminal of the power supply module 30 is connected to the voltage access terminals of all of the drive units 21 to provide the drive current for all of the drive units 21, i.e., the power supply module 30 provides the drive current for all of the driving units 21, and the current value of the drive current connected to all of the drive units 21 may be the same or different.

Specifically, the current detection module 40 includes current detection units that correspond to the drive units 21 in a one-to-one configuration, and each of the current detection units is configured to detect the drive current of a corresponding drive units 21 and output detection signals to the control module 50 according to detection results.

It is understandable that each of the drive units 21 is equipped with one of the current detection units independently, that each of the current detection units is configured to detect the drive current connected to or output by the corresponding drive units 21, and that the preset current value of all of the current detection units may be the same or different.

It should be noted that a plurality of the drive units 21 are configured to provide drive current to different light-emitting units 11 to realize better partition control to improve contrast and the saturation of the display screen while each of the current detection units independently detects the drive current of the corresponding drive unit 21 to improve detection efficiency.

In one embodiment, each of the current detection units may be disposed on each of the drive units 21.

In one embodiment, in the step S40, the control module 50 is further configured to control the grayscale value of the pixels of the display panel to maintain the second grayscale value when a number of times of the second detection signals received within a frame time is greater than a preset value of times of the second detection signals received within a frame time.

It should be noted that only when all of the current detection units detect that the corresponding drive units 21 accesses or outputs the drive current being greater than the corresponding current preset value for a period of time does the control module 50 control the grayscale value of the pixels to maintain the second grayscale value. Otherwise, the control module 50 controls the grayscale value of the pixels to restore to the first grayscale value, so as to prevent the grayscale value of the pixels from remaining at the second grayscale value when overcurrent protection is falsely triggered by one of the current detection units.

Specifically, each of the current detection units includes a current detection resistor R1 and a current detector 41.

Wherein, the current detection resistor R1 is connected in series between the voltage output terminal of the power supply module 30 and each of the voltage access terminals of each of the drive units 21, and two ends of the current detector 41 are respectively connected to two ends of the current detection resistor R1 for detecting the drive current.

In one embodiment, each of the current detection units further includes a protection resistor R2, a first end of the protection resistor R2 is connected to the current detector 41, and a second end of the protection resistor R2 is grounded or connected to reference voltage. The protection resistor R2 is configured to protect the current detector 41 to prevent damage to the current detector 41 when the current in the current detector 41 is too high.

In one embodiment, in the step S40, the control module 50 is further configured to send a reset signal to the current detection units when a number of times of the second detection signals received within a frame time is less than the preset value of times of the second detection signals received within a frame time, thereby stopping the current detection units from sending the second detection signals.

In the above-mentioned embodiments, the description of each of embodiments has its own emphasis. For parts that are not described in detail in one of embodiments, reference may be made to related descriptions of other embodiments.

Specific examples are configured in this article to illustrate the principles and implementation of the present disclosure. The descriptions of the above examples are only configured to help understand the technical solutions and core ideas of the present disclosure; those of ordinary skill in prior art should understand that they may still modify the technical solutions recorded in the foregoing embodiments, or some of the technical features are equivalently replaced; and these modifications or substitutions do not deviate an essence of corresponding technical solutions from a scope of the technical solutions of the embodiments of the present disclosure.

What is claimed is:

1. A display panel, wherein the display panel comprises a light-emitting module, a power supply module, a drive module, a current detection module, and a control module;
   the power supply module is connected to the drive module, and the power supply module is configured to provide a drive current for the drive module;
   the drive module is connected to the light-emitting module, and the drive module is configured to output the drive current to drive the light-emitting module to emit light;
   the current detection module is configured to detect the drive current, and output detection signals to the control module according to detection results of the drive current; and
   the control module is configured to adjust grayscale value of pixels of the display panel according to the detection signals,
   the current detection module is configured to alternately output first detection signals of a first potential and second detection signals of a second potential to the control module when a current value of the drive current is greater than or equal to a preset current value of the drive current, the first potential is greater than the second potential; and
   the control module is configured to adjust the grayscale value of the pixels of the display panel according to the second detection signals received, thereby decreasing the grayscale value of the pixels of the display panel from a first grayscale value to a second grayscale value.

2. The display panel in claim 1, wherein the control module is further configured to control the grayscale value of the pixels of the display panel to maintain the second grayscale value when a number of times of the second detection signals received within a frame time is greater than a preset value of times of the second detection signals received within a frame time.

3. The display panel in claim 1, wherein the control module is further configured to adjust the grayscale value of the pixels of the display panel when a number of times of the second detection signals received within a frame time is less than a preset value of times of the second detection signals received within a frame time, thereby restoring the grayscale value of the pixels of the display panel from the second grayscale value to the first grayscale value.

4. The display panel in claim 1, wherein the light-emitting module comprises at least two light-emitting units, and each of the light-emitting units comprises a plurality of light sources;
   the drive module comprises drive units individually connected to a corresponding light-emitting unit, and each of the drive units is configured to output the drive current to drive a corresponding light-emitting unit to emit light;
   a voltage output terminal of the power supply module is connected to voltage access terminals of all of the drive units to provide the drive current for all of the drive units; and
   the current detection module comprises current detection units that correspond to the drive units in a one-to-one configuration, and each of the current detection units is configured to detect the drive current of a corresponding drive unit and output the detection signals to the control module according to the detection results.

5. The display panel in claim 4, wherein each of the current detection units comprises a current detection resistor and a current detector; and
   wherein the current detection resistor is connected in series between the voltage output terminal of the power supply module and one of the voltage access terminals of the drive units, and two ends of the current detector are respectively connected to two ends of the current detection resistor for detecting the drive current.

6. A method for driving a display panel, wherein the display panel comprises a light-emitting module, a drive module, a power supply module, a current detection module, and a control module, wherein the method for driving the display panel comprises following steps:
   S10, providing a drive current for the drive module with the power supply module;
   S20, outputting the drive current to drive the light-emitting module to emit light with the drive module;
   S30, detecting the drive current, and outputting detection signals to the control module according to detection results of the drive current with the current detection module; and
   S40, adjusting grayscale value of pixels of the display panel according to the detection signals with the control module, in the step S30, when a current value of the drive current is greater than or equal to a preset current value of the drive current, the current detection module alternately outputs first detection signals of a first potential and second detection signals of a second potential to the control module, and the first potential is greater than the second potential; and in the step S40, when the control module receives the second detection signals, the control module adjusts the grayscale value of the pixels of the display panel, thereby decreasing the grayscale value of the pixel of the display panel from a first grayscale value to a second grayscale value.

7. The method for driving the display panel in claim 6, wherein in the step S40, when a number of times of the second detection signals received within a frame time is greater than a preset value of times of the second detection signals received within a frame time, the control module controls the grayscale value of the pixels of the display panel to be maintained as the second grayscale value.

8. The method for driving the display panel in claim 6, wherein in the step S40, when a number of times of the second detection signals received within a frame time is less than a preset value of times of the second detection signals received within a frame time, the control module adjusts the grayscale value of the pixels of the display panel, thereby restoring the grayscale value of the pixels of the display panel from the second grayscale value to the first grayscale value.

9. A display panel, wherein the display panel comprises a light-emitting module, a power supply module, a drive module, a current detection module, and a control module;

the light-emitting module is configured to emit light, and the light-emitting module comprises a plurality of light-emitting diode (LED) lamps distributed in an array;

the power supply module is connected to the drive module, and the power supply module is configured to provide a drive current for the drive module;

the drive module is connected to the light-emitting module, and the drive module is configured to output the drive current to drive the light-emitting module to emit light;

the current detection module is configured to detect the drive current, and output detection signals to the control module according to detection results of the drive current; and the control module is configured to adjust grayscale value of pixels of the display panel according to the detection signals, the current detection module is configured to alternately outputs first detection signals of a first potential and second detection signals of a second potential to the control module when the current value of the drive current is greater than or equal to a preset current value of the drive current, and the first potential is greater than the second potential; and the control module is configured to adjust the grayscale value of the pixels of the display panel according to the second detection signals received, thereby decreasing the grayscale value of the pixels of the display panel from a first grayscale value to a second grayscale value.

10. The display panel in claim 9, wherein the control module is further configured to control the grayscale value of the pixels of the display panel to maintain the second grayscale value when a number of times of the second detection signals received within a frame time is greater than a preset value of times of the second detection signals are received within a frame time.

11. The display panel in claim 9, wherein the control module is further configured to adjust the grayscale value of the pixels of the display panel when a number of times of the second detection signals received within a frame time is less than the preset value of times of the second detection signals are received within a frame time, thereby restoring the grayscale value of the pixels of the display panel from the second grayscale value to the first grayscale value.

12. The display panel in claim 9, wherein the first grayscale value is 55, and the second grayscale value is 45.

13. The display panel in claim 9, wherein the light-emitting module comprises at least two light-emitting units, and each of the light-emitting units comprises a plurality of light sources;

the drive module comprises drive units individually connected to a light-emitting unit, and each of the drive units is configured to output the drive current to drive a corresponding light-emitting unit to emit light;

a voltage output terminal of the power supply module is connected to voltage access terminals of all of the drive units to provide the drive current for all of the drive units; and the current detection module comprises current detection units that correspond to the drive units in a one-to-one configuration, and each of the current detection units is configured to detect the drive current of a corresponding drive unit and output the detection signals to the control module according to the detection results.

14. The display panel in claim 13, wherein each of the current detection units comprises a current detection resistor and a current detector; and wherein the current detection resistor is connected in series between the voltage output terminal of the power supply module and one of the voltage access terminals of the drive units, and two ends of the current detector are respectively connected to two ends of the current detection resistor for detecting the drive current.

15. The display panel in claim 14, wherein each of the current detection units further comprises a protection resistor, a first end of the protection resistor is connected to the current detector, and a second end of the protection resistor is grounded or connected to a reference voltage.

\* \* \* \* \*